(12) United States Patent
Berdut-Teruel (10) Patent No.: US 8,018,116 B2
(45) Date of Patent: Sep. 13, 2011

(54) ELECTRIC MOTOR OF PARALLEL CYCLES

(76) Inventor: Elberto Berdut-Teruel, Carolina, PR (US)

( * ) Notice: Subject to any disclaimer, the term of this patent is extended or adjusted under 35 U.S.C. 154(b) by 0 days.

(21) Appl. No.: 12/707,040

(22) Filed: Feb. 17, 2010

(65) Prior Publication Data

US 2010/0176685 A1 Jul. 15, 2010

Related U.S. Application Data

(63) Continuation-in-part of application No. 12/029,930, filed on Feb. 12, 2008, now abandoned.

(51) Int. Cl.
*H02K 23/02* (2006.01)
*H02K 23/00* (2006.01)

(52) U.S. Cl. ........ 310/233; 310/114; 310/219; 310/231; 310/268

(58) Field of Classification Search .................. 310/177, 310/154.001, 268, 112, 113, 114, 229, 231, 310/233, 236
See application file for complete search history.

(56) References Cited

U.S. PATENT DOCUMENTS

| | | | | | |
|---|---|---|---|---|---|
| 4,508,998 | A | * | 4/1985 | Hahn | 318/400.41 |
| 4,684,839 | A | * | 8/1987 | Fujisaki et al. | 310/154.05 |
| 4,739,203 | A | * | 4/1988 | Miyao et al. | 310/67 R |
| 6,239,531 | B1 | * | 5/2001 | McGaughey | 310/233 |
| 6,724,121 | B2 | * | 4/2004 | Ettridge | 310/237 |
| 7,081,696 | B2 | * | 7/2006 | Ritchey | 310/114 |

* cited by examiner

*Primary Examiner* — Quyen Leung
*Assistant Examiner* — Michael Andrews
(74) *Attorney, Agent, or Firm* — Luis Figarella (57) ABSTRACT

A motor arrangement between the movable body and the commutation system comprising movable body coils assembling, wherein said movable body coils assembling are energized for short periods of time of an electric cycle in order to initiate a movement at the movable body. The current applied to the coils assembling is stopped during a passive phase in order to complete a rotary motion based primarily to the magnetic relation between the static body and the movable body, more particularly the magnetic relation between the coils assembling and the permanent magnets in order to reduce the heat and energy consumption and therefore increasing the motor life.

6 Claims, 10 Drawing Sheets

ELECTRIC MOTOR OF PARALLEL CYCLES

RELATED APPLICATIONS

This application is a continuation in part related to U.S. patent application Ser. No. 12/029,930 filed on Feb. 2, 2008 now abandoned.

STATEMENT REGARDING FEDERALLY SPONSORED RESEARCH AND DEVELOPMENT

N/A

BACKGROUND OF THE INVENTION

1. Field of the Invention

The invention is related to a motor and configuration between the rotor and the commutation system, and more specifically a motor wherein said rotor is aligned with the commutation system supplying current to the rotor coils for a short period of time during an electric cycle providing less energy consumption therefore reducing heat damages at the coils.

2. Discussion of the Background

Motors are used for several applications in our daily lives. Basically, the motor structure comprises a rotor and a stator wherein said stator and/or rotor are either made by wound coils or permanent magnets. The interaction between magnetic fields and electric fields generate displacement that is transferred to rotational or linear motion for the motor. The DC motor, for example, is a type of motor which runs by DC electric power. Most common DC motors are brushed and brushless types. The motors are energized constantly with electric current supplied through the commutation system. The current is applied per cycles and usually the polarity or direction of the current applied to the coils changes in a single cycle wherein said cycle is define as an event of a complete occurrence of a process of repeated events. Usually in electric motors a electric cycle is define as the repeated event of the displacement of the rotor between at least a pair of magnetic bodies due to the change in current wherein said magnetic bodies are arranged consecutive in a alternatively magnetic polarity manner.

Throughout the years many improvements have been implemented to eliminate problems with the motor such as cogging torque and heat at the coils, for example, tapering edges at the poles and/or the lamination of the stator and/or rotor. However, the consumption of energy and the excessive heat at the coil structure is still a major problem producing demagnetization and reducing motor life.

SUMMARY OF THE INVENTION

The present invention overcomes the disadvantages of the Prior Art and provides a configuration between the rotor and the applied current though the commutation system wherein the energy consumption is reduced.

Another object of the invention is to provide a configuration that reduces heat and increases motor life.

Another object of the invention is to provide a more efficient DC motor.

Another object of the present invention is to applied current to the rotor for a short period of time while the displacement of the rotor in completed due to the magnetic interaction between rotor coils assembling and the stator magnets.

Another object of the invention is to provide a mechanical and/or electrical system to control the energization of the rotor.

Yet another object of the present invention is to optimize the use of the magnetic field between the stator and rotor.

The invention itself, both as to its configuration and its mode of operation will be best understood, and additional objects and advantages thereof will become apparent, by the following detailed description of a first embodiment taken in conjunction with the accompanying drawing.

The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying drawings which are incorporated herein constitute part of the specifications and illustrate the first embodiment of the invention.

DETAILED DESCRIPTION

Figure 1:
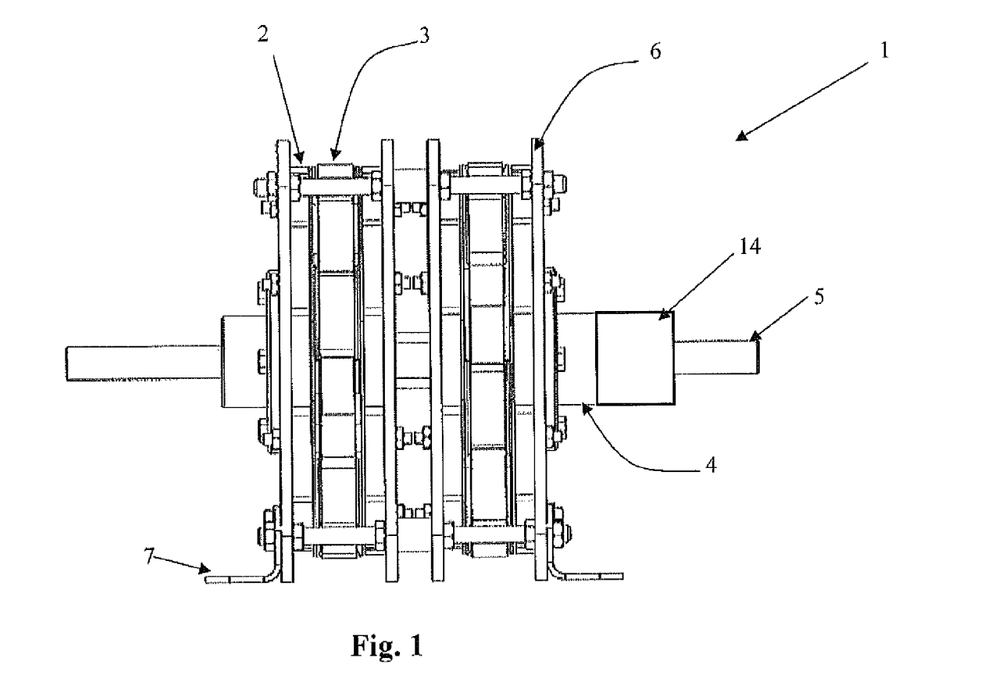
FIG. 1 shows the view of the first embodiment.
Figure 2:
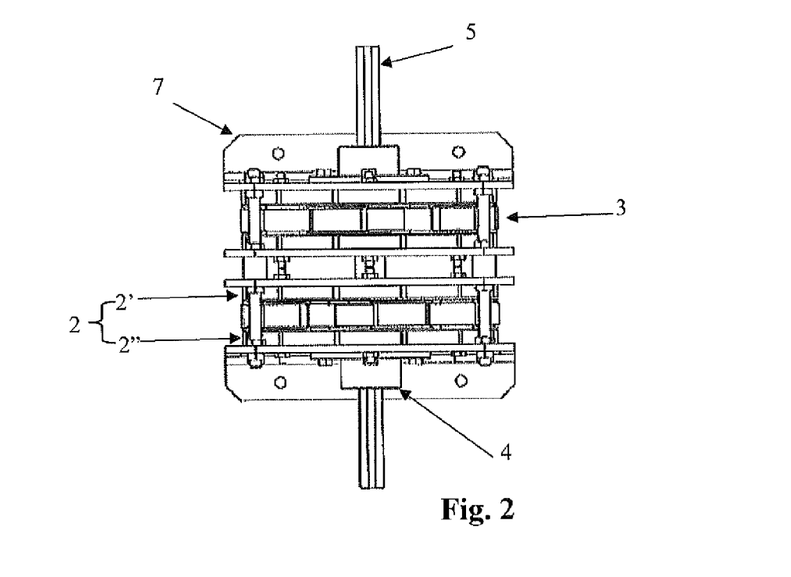
FIG. 2 is a top view of the first embodiment.
Figure 3:
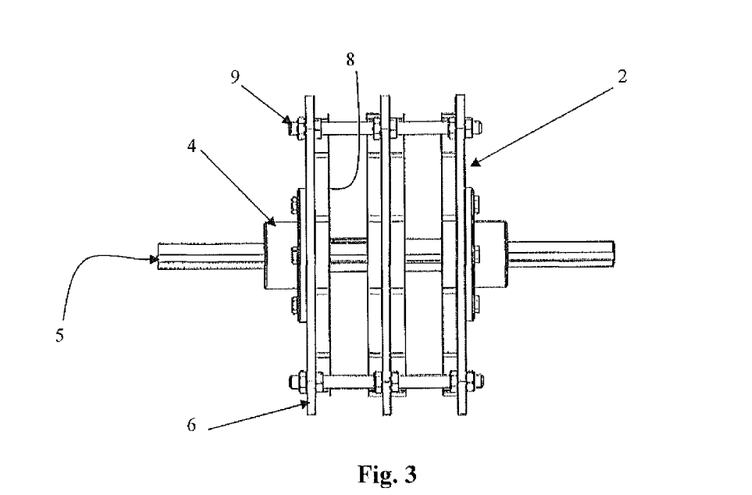
FIG. 3 shows the first embodiment rotor and shaft assembly.
Figure 4:
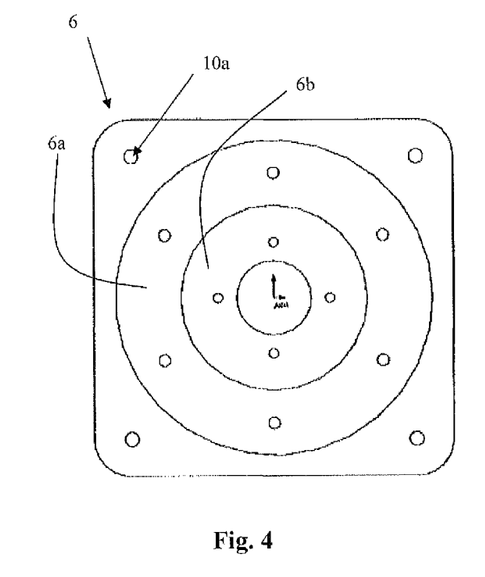
FIG. 4 shows the frame.
Figure 5:
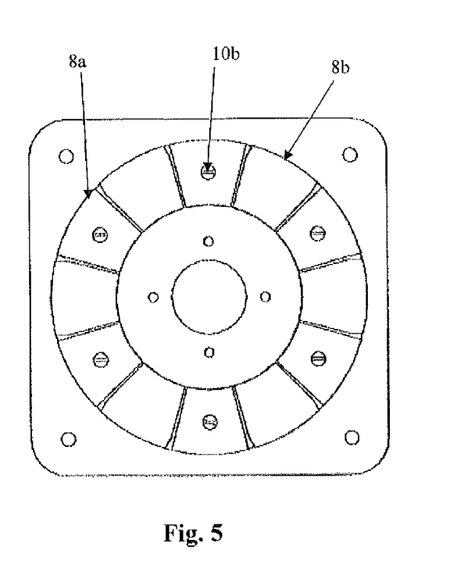
FIG. 5 shows the frame and stator magnet assembly.

FIG. 1 to FIG. 3 show a DC motor 1 as an example for the present invention. The DC motor 1 comprises a stator 2 with permanent magnets 8, a rotor 3 with coils 11, bearings 4, a shaft 5, a frame 6 and a commutation system 14. The DC motor 1 is a flat motor having two motors connected in parallel to the same shaft 5. The stator is assembled to the frame 6 by connecting means such as bolts or any other mean that fixes the stator structure to the frame. The stabilization and support of the frame to any other structure is acquired by adding position holders 7 to each side of the frame 6. Bearings are provided at the distal ends of the shaft and are connected and fixed to the frame 6 by bolts.

Figures 6, 7:
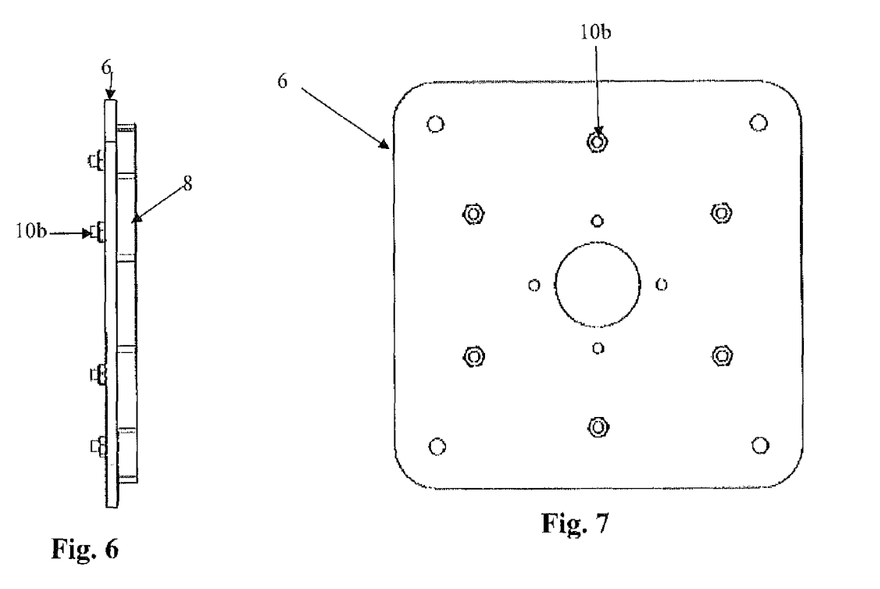
FIG. 6 is a side view of frame and stator magnets assembly.
FIG. 7 is a back view of frame and stator magnets assembly.
Figure 8:
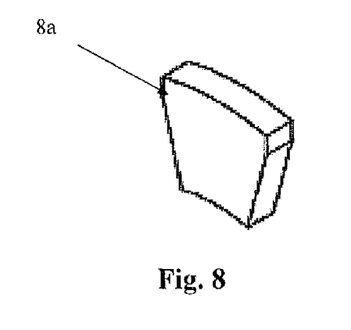
FIG. 8 shows the magnetic piece.

The stator 2, as mentioned before, comprises several magnets 8 arranged in a circular contour, wherein two stator similar parts 2', 2" parallel to each other are facing the rotor which is located between both stator parts. FIGS. 3-7 show the stator assembly 2 with the shaft 5. Magnets 8 are attached by bolts 10b which are inserted thru holes Bc at the center of a ferromagnetic pole 8a, said ferromagnetic poles are located between the permanent magnets 8b completing the stator's circular contour. The use of ferromagnetic material prevents the escape of magnetic flux; however the whole stator can be made just by permanent magnets. The permanent magnets 8b and ferromagnetic material 8a are fixed to the frame 6 at a middle circular section 6a. The screws or bolts 10b are adjusted by nuts as shown in FIG. 6 and FIG. 7; however any fixing means can be used, such as glue. The permanent magnets 8b have tapered edges, as shown in FIG. 8, reducing the togging torque, for a smoother motor operation.

Figure 9:
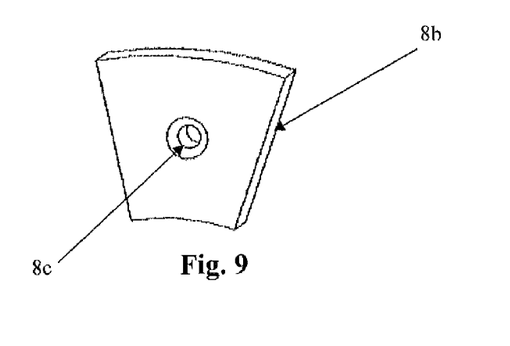
FIG. 9 shows the ferromagnetic pole piece.

FIG. 9 shows more clearly the holes 8c at the ferromagnetic material 8a. The permanent magnets 8b at the stator 2 are arranged having alternative polarities in the circumferential direction all over the stator. As mentioned before, the two stator parts 2',2" will have the same shape but the magnets 8 facing each other are arranged having different polarities.

Figures 10, 11, 12:
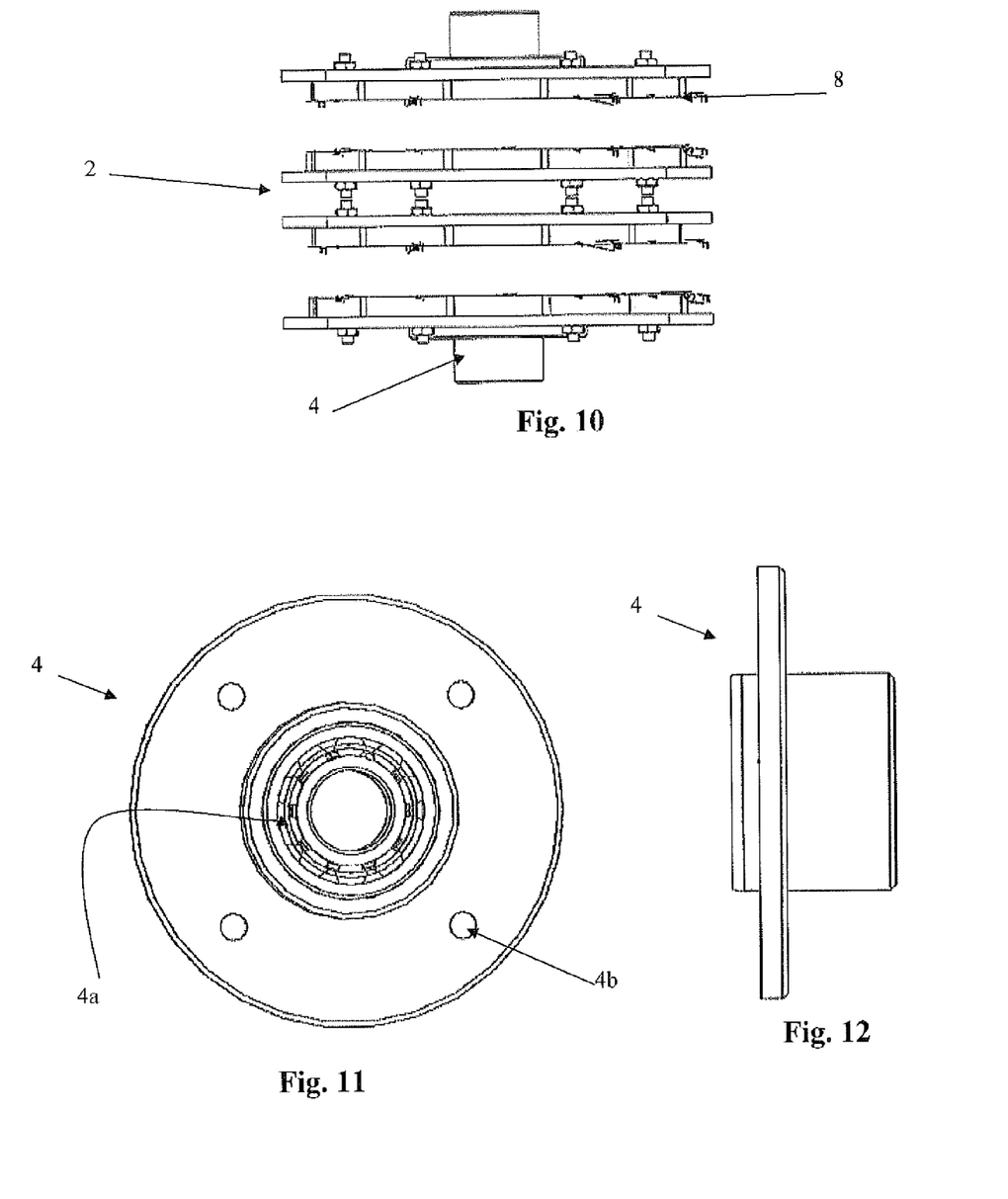
FIG. 10 shows a multiple frame and stator magnet assembly.
FIG. 11 shows a top view of the bearing.
FIG. 12 shows a side view of the bearing.
Figure 13:
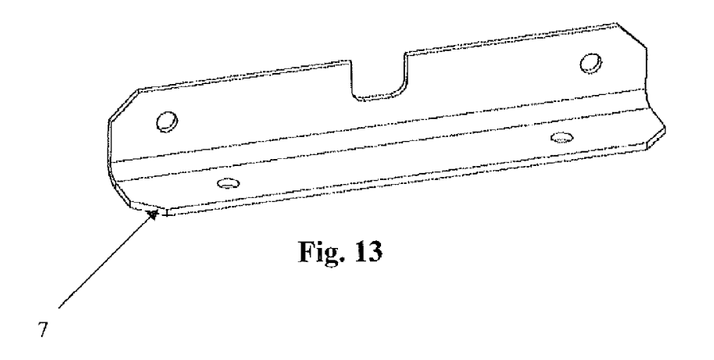
FIG. 13 shows the frame supports.
Figures 14, 15:
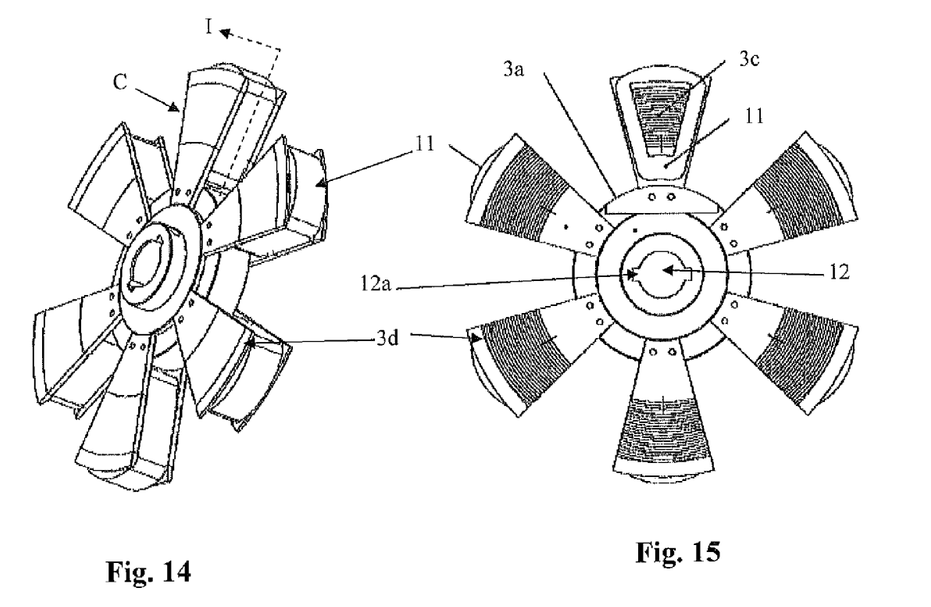
FIG. 14 shows the rotor isometric view.
FIG. 15 shows the rotor top view with a cut portion I.
Figure 16:
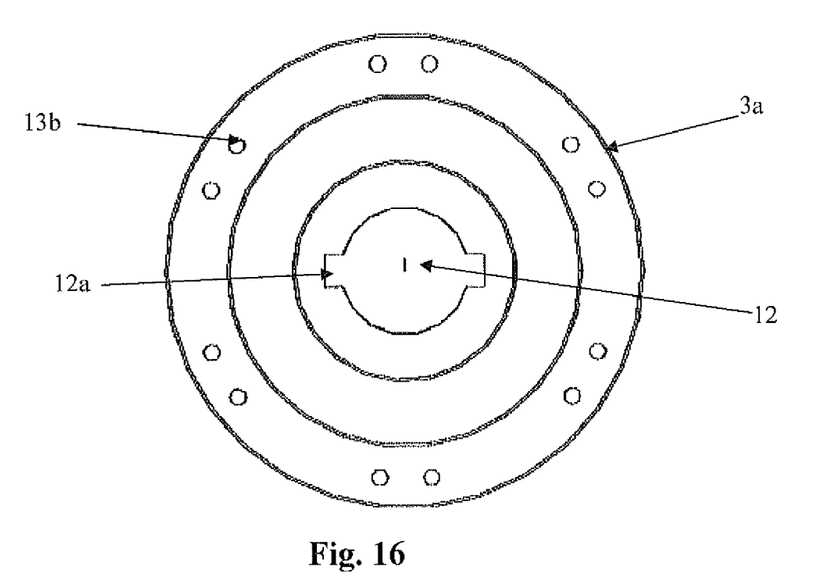
FIG. 16 is the top view of the rotor core.

Ball bearings 4a are used to support the shaft 5 while facilitating the rotational motion. Two ball bearings fixed to the frame 6 by bolts or any other fixing mean are located between the stator and the shaft and extends further than the frame in the axial direction which is parallel to the shaft. In the first embodiment and as shown in FIG. 11 and FIG. 12 the bearing 4 is provided with holes 4b which are aligned with the frame's inner holes at the inner circular section 6b in order to fix the frame and said bearing 4 closer to the shaft for a more steady support. The holes 4b and/or the inner circular section 6b might be provided with a damper such as rubber or any elastic material in order to reduce vibration.

FIGS. 14-24 are directed to show the rotor assembly more particularly the rotor parts, wherein said rotor assembly 3 comprises several rotor parts such as a rotor core 3a and coil assembly C.

Figure 17:
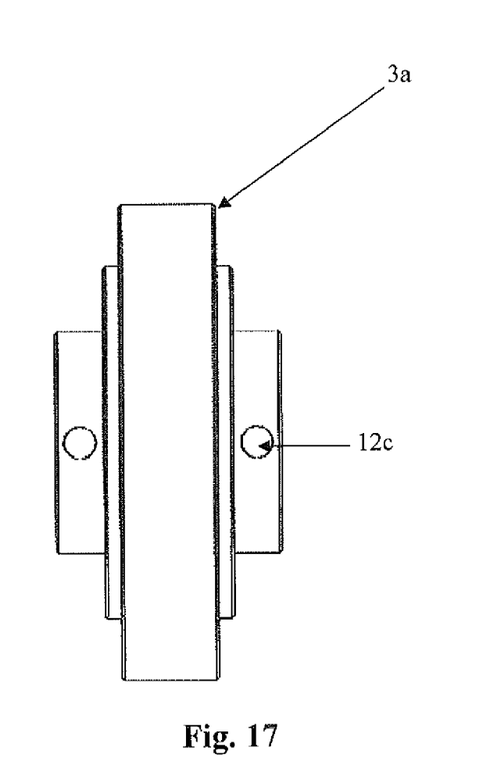
FIG. 17 is the side view of the rotor core.
Figure 18:
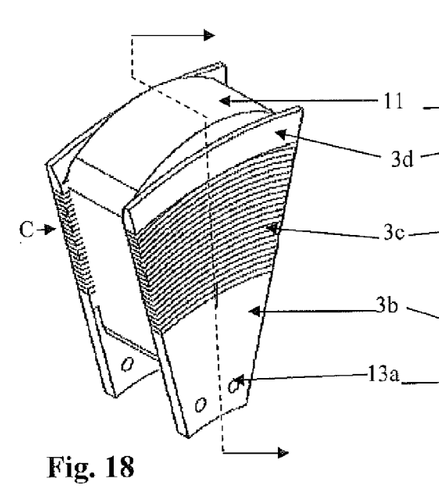
FIG. 18 is the coil assembly.
Figure 19:
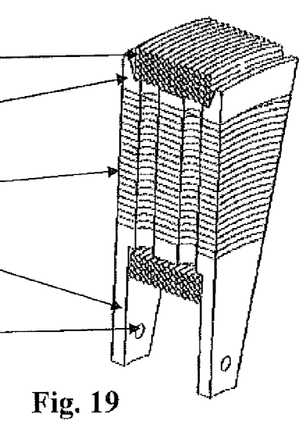
FIG. 19 is the coil assembly with a cut portion II.
Figure 20:
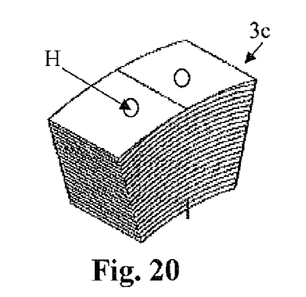
FIG. 20 shows the laminated main body of the coil assembly.
Figure 21:
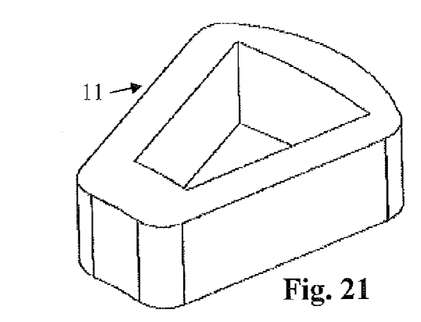
FIG. 21 shows the coil.
Figure 22:
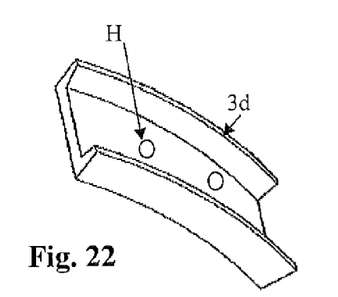
FIG. 22 shows the rotor tip.
Figure 23:
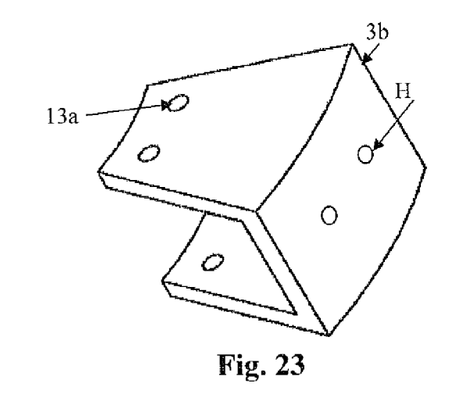
FIG. 23 shows rotor coil assembling support.

The rotor assembly 3 also includes a rotor core 3a comprising three cylindrical sections. The first cylindrical section has a center hole 12 wherein the shaft 5 passes through with groove 12a in order to fix the shaft and the rotor core 3a, also is provided as shown in FIG. 17, with fixing holes 12c perpendicular to the rotor or shaft axis and extends further than any of the other cylindrical sections. The second cylindrical portion has a bigger diameter than the first cylindrical portion but shorter in the axial direction. This portion provides more force and stability to the rotor's core to support adjustable parts at the third cylindrical section. The third cylindrical section supports the coil's assembly, wherein said third cylindrical section is provided with holes 13b for fixing coil base 3b.

The coil assembly C, as shown in FIGS. 18-23, comprises a coil 11, the coil base 3b, coil body 3c and coil bridge 3d. The coil 11 is wound around the coil base 3b, coil body 3c and coil bridge 3d. The coil base 3b, the coil body 3c and the coil bridge 3d are provided with holes H.

The holes H in combination with bolts are used to integrate the coil body, base and bridge before is the coil 11 is wound around the assembled coil structure.

Figure 24:
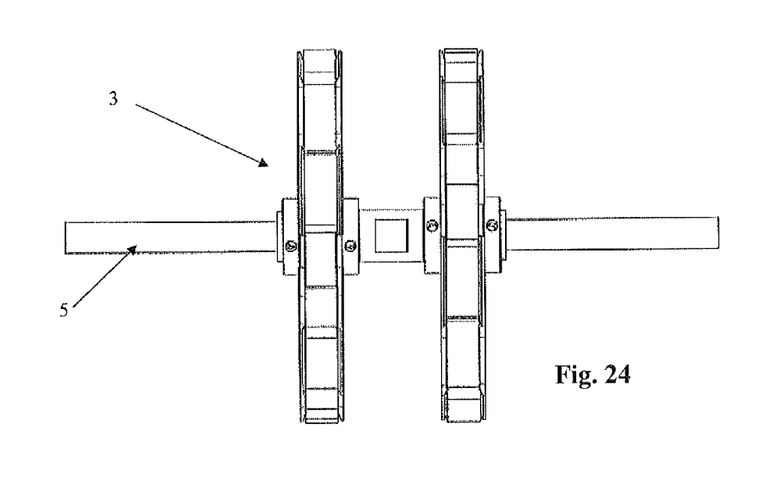
FIG. 24 shows the rotor and shaft assembly.

As mentioned before the rotor core 3a is assembled with the coil assembly C in order to provide a complete rotor assembly 3. The rotor assembly 3 is further combined with the shaft 5 as shown in FIG. 24, wherein said rotor 3 is attached to the shaft 5 by screws.

Figure 25:
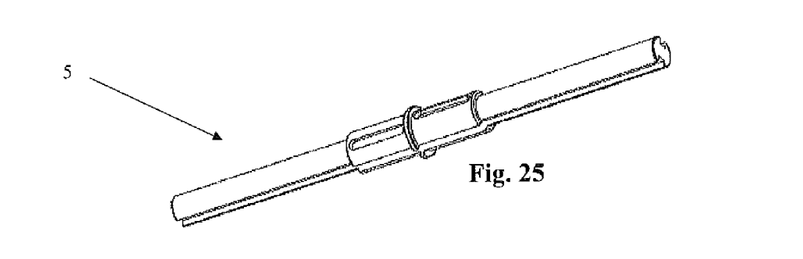
FIG. 25 is an isometric view of shaft.
Figure 26:
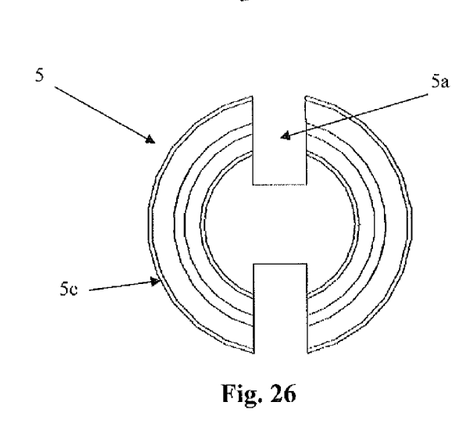
FIG. 26 shows shaft front view.
Figure 27:
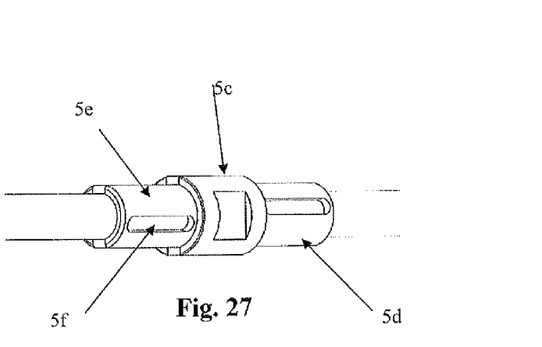
FIG. 27 exploded view of shaft coupling means.

The shaft 5 comprises a continuous groove 5a which extends from each distal end serving not just for the assembling but also for cooling purposes. The shaft has a fixing portion comprising a two cylindrical portion 5e, 5d having grooves 5f. Each rotor core 3a is fixed to a cylindrical section 5e, 5b respectively. A center portion 5c located between the cylindrical sections separates and avoids the contact between rotors assembling.

As mentioned before the DC motor assembly comprises two rotors 3 and two stators 2 arranged in parallel over the same axis connected shaft 5. In order to provide motion to the DC motor 1, direct current is applied through the commutation system 14 to the coils at the rotor 3. The current applied to the rotor 3 is controlled mechanically or electronically in such way that the coils are charged less than 66% of a 360 degrees electrical cycle. The duration of the current applied to the coils is directly affected by the coil's assembly material and the magnets magnetic force. As mentioned the electric cycle is define as the repeated event of the displacement of the magnetic rotor 3 between at least a pair of magnetic bodies due to the change in current wherein said magnetic bodies are arranged consecutive in a magnetic polarity alternatively manner. In the instant case the duration of the applied current to the coils is directly affected by the time of the active period wherein the coils are repulsed by the magnets. The preferred time for applying current to the coil during an electric cycle is less than 50% of said electric cycle wherein the repulsive force generated by the magnetic fields is the primary force for the movement of the rotor.

The motor 1, as mentioned before, is configured to be energized for a period equal or less than 50% of the electric cycle in such way that the displacement of the rotor with respect to the stator is based on the repulsive force generated between the permanent magnets 8 and the rotor coils 11. The result of having limit periods to energize the coils 11 is the displacement of the rotor, wherein said displacement of the rotor 3 is primarily stimulated by the magnetic force interaction between the coil 11 and the permanent magnets 8 without continuously applying current. Basically the object of applying current is to polarize the coils assembling C in order to start the repulsion process between the coils assembling 11 and the magnets 8. As mentioned before, having limited periods of applying current is different from substantially supplying continuous current to the coils during the entire electric cycle therefore the current system avoids damages due to high temperatures. It is important to understand that the current arrangement for the movement of the rotor can be used in a linear motor and a reciprocal motor.

The displacement of the rotor in relation with the stator is determined by the interaction between the coils assembling C and the permanent magnets 8. For example, the coils assembling C are energized in order to provide a particular polarity for short period of time in such way that initializes the movement of the rotor 3. The supplied current to the coil assembling C by means of the commutation system is divided in two phases. The first phase is known as the active cycle in which current is applied to the coils 11 in order to polarize and generate the repulsion effect due to the difference in polarities with the magnets 8. The second phase is known as passive or attraction cycle. The passive cycle is characterized for being a phase wherein the coils assembling C are not energized and are demagnetized. During this phase the coils assembling C are attracted by the closest magnetic poles. As mentioned before, is preferred that the coils 11 are energized for approximately 50% of the electric cycle during the active cycle in order to generate a repulsion effect with the closest magnets. On the other hand during the passive cycle the temperature of the coils is reduced due to the lack of applied current.

The passive cycle comprises a passive sub-phase classify as zero/neutral sub-phase and the active cycle comprises a first active sub-phase and a second active sub-phase classify as positive sub-phase and negative sub-phase respectively. During the positive sub-phase current is applied to the coils 11 in order to produce a polarity that initiates the repulsion between the coil assembling C and the permanent magnets 8. After the movement accomplishment for a period of time the current supplied to the coils 11 stops and the neutral sub-phase starts. During the neutral sub-phase the coils assembling are attracted by the permanent magnets 8 resulting in the displacement or motion by means of the magnetic force interaction between the coil assembling and permanent magnets. The coil assembling C continues the movement toward the magnets 8 contiguous to the previous magnets 8 that provide the previous repulsion action. The coil assembling C moves toward a balance position or point wherein the magnetic forces pulling the coils assembling C structure are balanced. Usually the point of balance is located between two magnets 8 facing each other having different polarities wherein the coil assembling C aligns between said two magnets 8. Ones the coil assembling C starts aligning with the contiguous magnets current having different polarity or direction with respect to the positive sub-phase is applied to coils 11 in order to polarize said coil assembling C. At this point the negative sub-phase starts. The negative sub-phase has as result the repulsion of the contiguous magnets due to the relation between the coil assembling C polarity and the contiguous magnet 8 polarity. Further the current is suspended and the magnets next to the contiguous magnets attract the coils. The process as explained before repeats until no current is provided during the active cycle.

Figure 28:
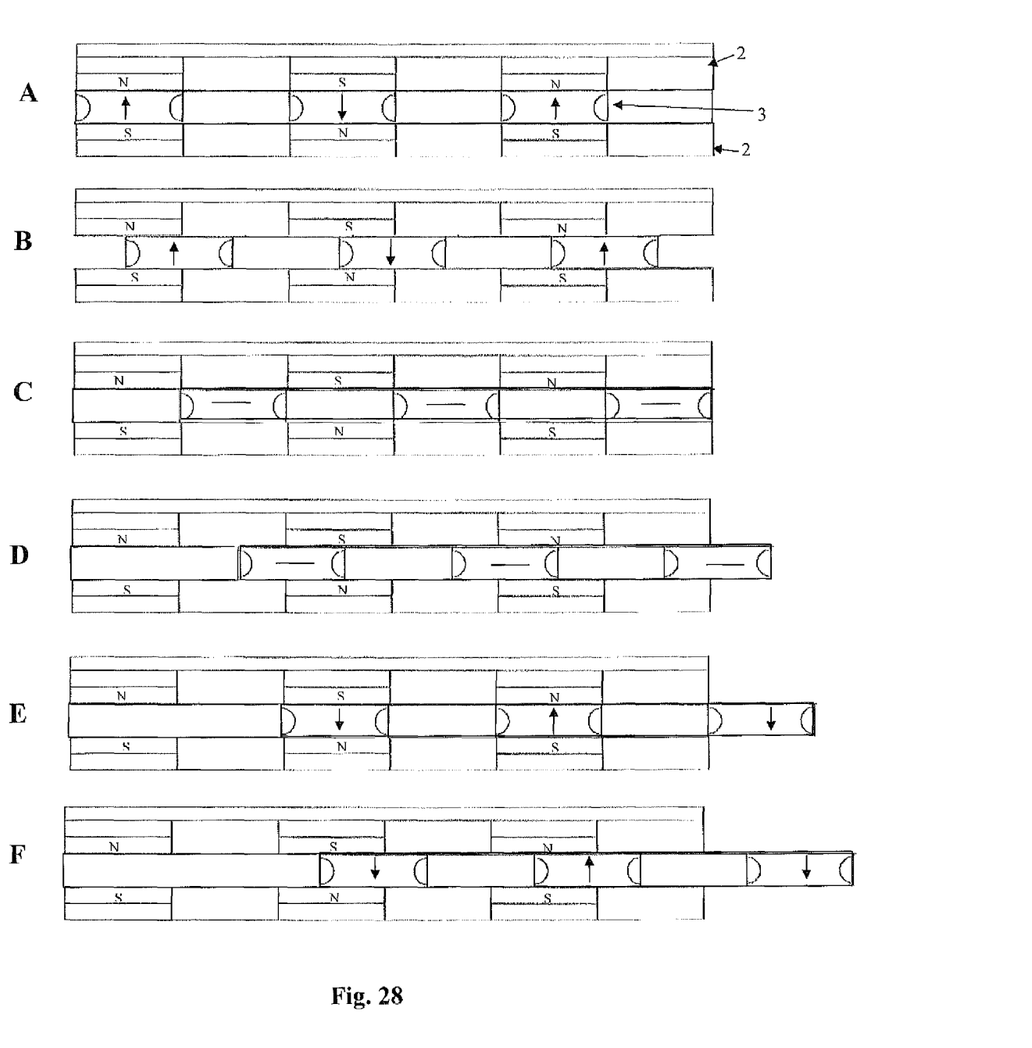
FIG. 28 shows the rotor displacement due to supplied current and magnetic force interaction.
Figure 29:
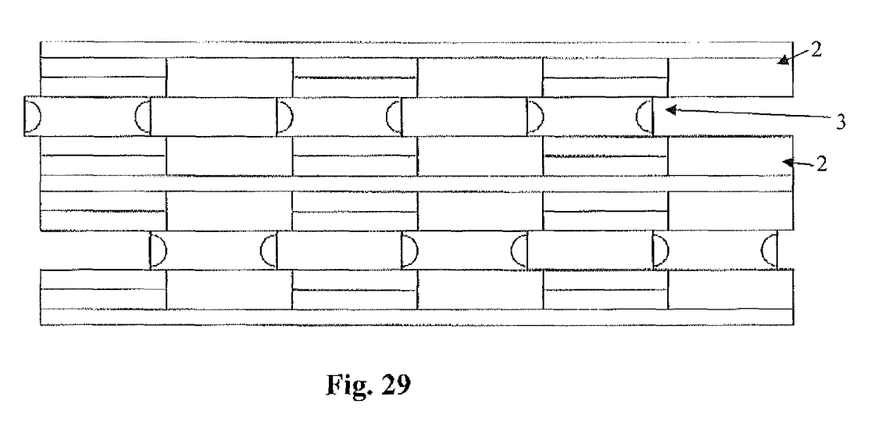
FIG. 29 shows the arrangement of part for a multiple dual rotor.

For example, FIG. 28 shows different stages wherein the coil 11 is charged providing different polarities at the coil assembly C in order to set in motion the rotor 3 with respect to the stator 2. The current applied to the coil 11 by the commutation means 14 generates a positive sub-phase, zero/neutral sub-phase and negative sub-phase at said coil assembling C. For example at stage A, this stage belongs to the active cycle, the coil's polarity changes in order to be repulsed by the magnets 8. The commutation system 14 continuous supplying current to the coils though stage B, also part of the active cycle, until reaching stage C. Ones stage C is reached the current is suspended until completed stage D. Stage C and stage D are part of the passive cycle therefore the coil 11 are not energized and at the same time are attracted by the contiguous magnets 8. The coil assembling C moves toward the contiguous magnets 8 try to align with the magnetic fields until the coil assembling C reaches stage E. During stage E current is applied to the coils 11, however the current has different direction than the one applied through the positive sub-phase. This is known as the negative sub-phase also part of the active cycle. At this point the magnets 8 are repulse by the contiguous magnets toward a different set of magnets 8. The process is repeated several times in order to provide motion to the rotor. FIG. 29, shows the combination of the same principal with the use of two rotors 3 and two stators 2 connected in parallel.

The combination of multiple rotors 3 connected to a shaft 5 and multiple stator assemblies 2 interacting with said rotors 3 reduce even more the consumption of energy. This phenomenon is a direct result of energizing each rotor 3 alternatively. For example in a two motor arrangement movement is generated when at the first motor the energized rotor 3 interacts with the respectively stator assembly while at the second motor the rotor in absence of electricity and connected by the shaft 5 moves as result of the shaft connection and the attraction between the stator magnet and coil structure at said second motor. Eventually an electric or mechanical control system at the commutation system 14 switches and energizes the second motor wherein the rotor interacts with the respectively stator assembly and the first rotor moves as result of the shaft connection between rotors and the attraction between the stator magnet and coil assembling structure at said first motor. In the instant case rotors 3 are skewed with respect to each other in such way that when one rotor moves as result of the energized coil structure the other rotor moves as result of the attraction between magnets 8 and the coil assembling C structure wherein both action contributes to the full movement of the shaft 5. The displacement between rotors depends of the quantities of motors connected to the same shaft.

Figure 30:
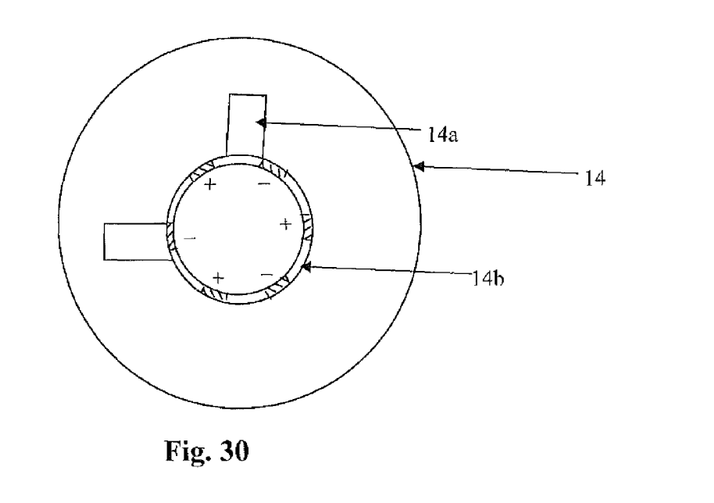
FIG. 30 shows a commutation system.

FIG. 30, shows a commutation system 14, such as a mechanical commutation system using brushes 14*a* and a commutator 14*b*. The commutation system may be a mechanical commutation system or an electrical commutation system. For example instead of the mechanical commutation system using brushes an electrical commutation system which electromagnetically detects rotation of the rotor and switches the current applied to magnetic coils could be implemented.

Reducing the energy consumption depends more on the magnets 8 and the current applied to the rotor body than the commutation system 14 selected since the change of polarity and charge of the coil assembling C might be needed for a shorted or longer period during the electric cycle, more particularly during the active cycle of the entire electric cycle. It is important to know that any other commutation system 14 can be implemented as long as it is capable of changing magnetic polarity at the coil assembling C effectively.

While the invention has been described as having a first design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patentable distinguish any amended claims from any applied prior art.

The invention claimed is:

1. A DC motor comprising;
   a static body assembly comprising permanent magnets;
   a rotor assembly, wherein said rotor assembly comprises a rotor core and a plurality of coil assemblies, wherein each said coil assembly comprises a coil, a coil base, a coil body and a coil bridge, wherein said coil body is located between said coil bridge and said coil base, wherein said coil body, said coil base and said coil bridge cover said coil and wherein said coil base is attached to said rotor core;
   a bearing means;
   a shaft, wherein said rotor assembly is fixed to the shaft by fixing means;
   a commutation system connected to each said coil assembly, wherein said commutation system wherein said commutation system generates a positive, a zero and a negative magnetic polarity orientation at said coil during portions of an electric cycle;
   wherein a positive phase comprises the commutation system supplying current in a first direction; a negative phase comprises the commutation system supplying current in a second direction and a neutral phase comprises the commutation system supplying no current; and
   said commutation system is configured to supply a positive current for a third or less of the electrical cycle, supply a negative current for a third or less of the electrical cycle and supplying no current to said coil assembly during the balance of the electrical cycle.

2. The DC motor of claim 1, wherein;
   the electric cycle is arranged to have a positive phase, a first neutral phase, a negative phase and a second neutral phase.

3. The DC motor of claim 1, wherein;
   said neutral phase cycle comprises the permanent magnets attracting the coil body.

4. The DC motor of 1, wherein;
   said static body assembly has a circular contour comprising permanent magnets or ferromagnetic material, fixed to a frame.

5. The DC motor of claim 4, wherein;
   said bearing means support the shaft and extends further than the frame.

6. The DC motor of claim 1, wherein said DC motor comprises;
   a plurality of rotor assemblies and a plurality of static body assemblies parallel to each other, wherein said rotor assemblies are connected to the same shaft and commutation system, wherein the magnets within each static body assembly are significantly aligned along the shaft axis; and
   the coil assemblies of two or more of the said parallel rotor bodies are skewed with respect to each other along the shaft axis in such a way that when one rotor moves as the result of one or more of its coil bodies being energized, one or more of the other rotors have their coil bodies in a neutral phase, with the attraction between magnets and said coil assemblies contributing to the movement of the shaft.

* * * * *